March 24, 1959 — W. M. CHALMERS — 2,879,077
AIR CUSHION SUSPENSION FOR SINGLE AXLES
Filed Feb. 2, 1956 — 5 Sheets-Sheet 1
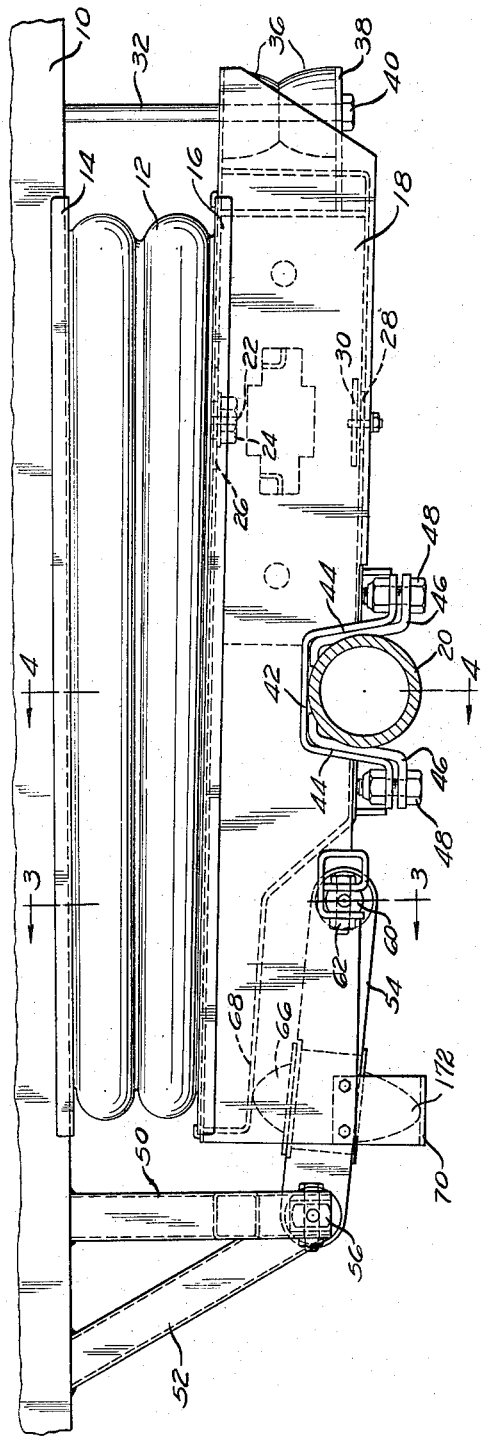
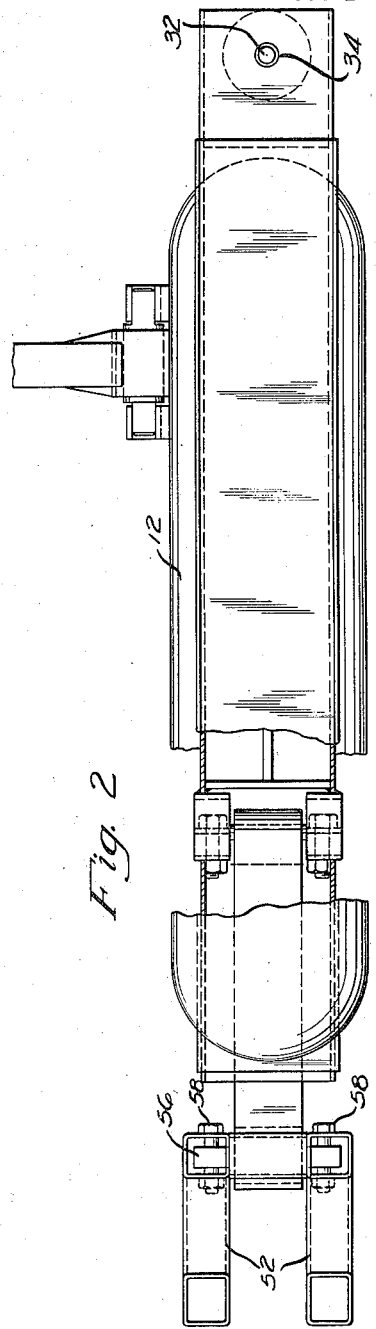
INVENTOR.
WILLIAM M. CHALMERS
BY RICHEY, WATTS, EDGERTON & McNENNY
ATTORNEYS

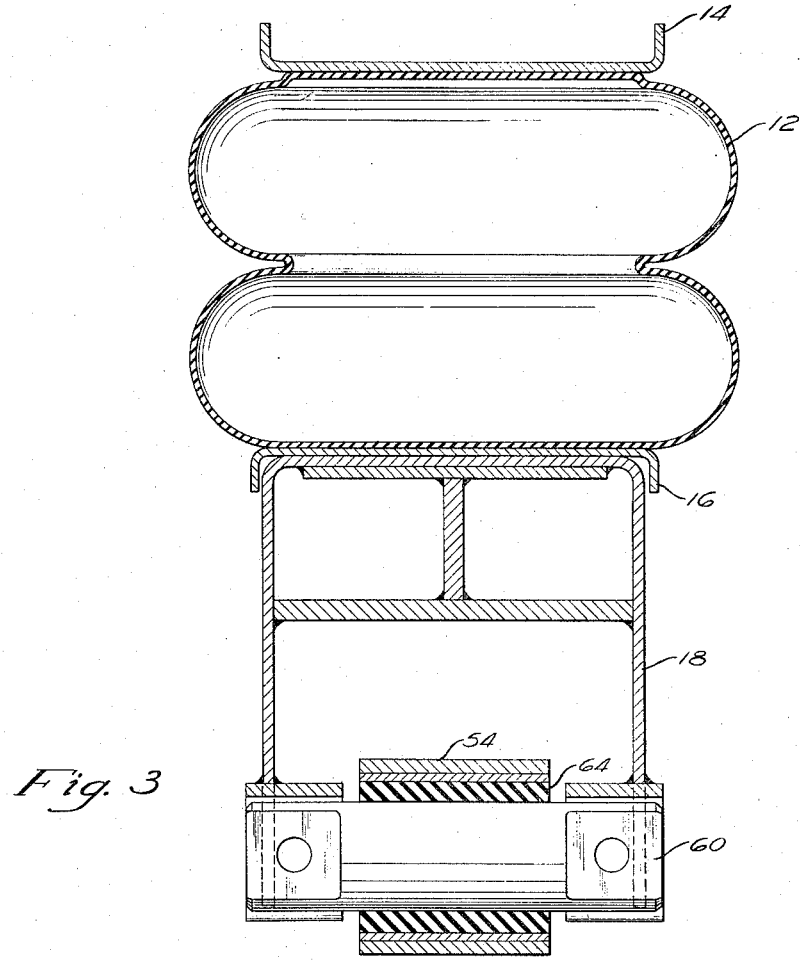

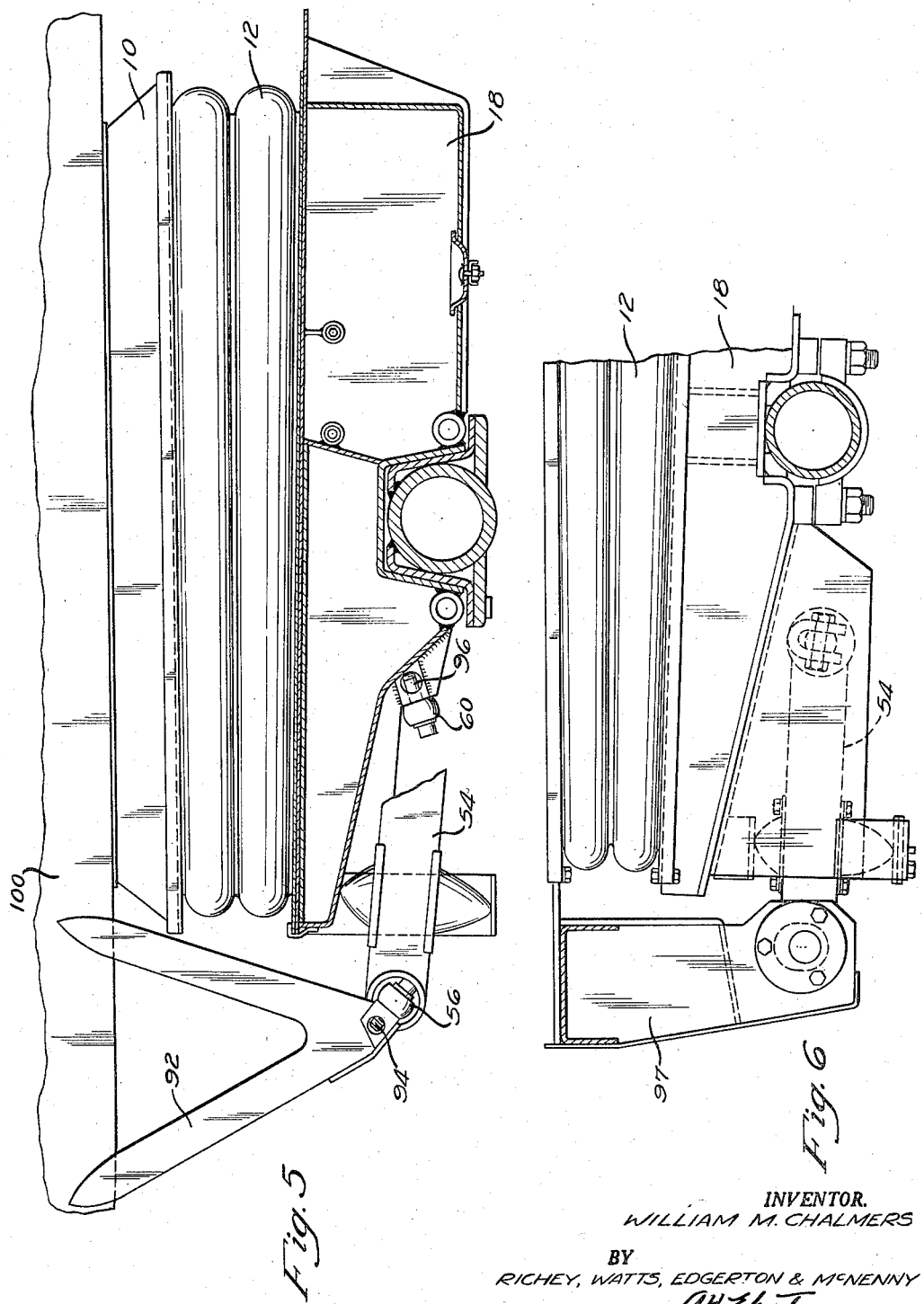

March 24, 1959  W. M. CHALMERS  2,879,077
AIR CUSHION SUSPENSION FOR SINGLE AXLES
Filed Feb. 2, 1956  5 Sheets-Sheet 5

INVENTOR.
WILLIAM M. CHALMERS
BY
RICHEY, WATTS, EDGERTON & McNENNY
ATTORNEYS

United States Patent Office 2,879,077
Patented Mar. 24, 1959

2,879,077

AIR CUSHION SUSPENSION FOR SINGLE AXLES

William M. Chalmers, Niles, Ohio, assignor to Youngstown Steel Car Corporation, Niles, Ohio, a corporation of Ohio Application February 2, 1956, Serial No. 563,054

3 Claims. (Cl. 280—124)

This invention relates to vehicle suspensions and more particularly to suspensions using pneumatic cushioning devices for supporting the body of the vehicle on the running gear or axles.

The present invention is particularly adapted for use with a single trailing axle. However, the invention may also be embodied in driving and steering axles as well as tandem axles. The air spring suspension contemplated herein is in the form of an air cushion or bellows inflated with a compressible gas such as air and supported in a suspension arrangement which controls and positions the axle beneath the vehicle body in such a manner that only compressive stresses are applied to the cushion. The air spring is sized and charged with sufficient pressure to carry the load applied thereto by the vehicle body.

In arranging a suspension system utilizing an air cushion device, it is required that sufficient control of the axle is maintained without applying lateral stresses to the air cushion. In a conventional leaf spring suspension, the spring member itself has sufficient rigidity and strength to transmit forces from the axle to the vehicle body other than the forces required to support the load. Therefore, a different type of suspension assembly is required when the pneumatic cushioning device is used.

In addition, the operation of the vehicle results in the application of linkage forces to the suspension system other than those applied by the load and the weight of the vehicle. The most common effect which must be overcome is produced by using the brakes on the wheels which tends to rotate the axle as well as to shift the axle towards the rear of the vehicle which would result when the brakes were applied when the vehicle were moving forward. Likewise, when the vehicle were moving rearwardly similar forces would be applied in the opposite direction.

When the vehicle is moving freely, any irregularity in the road surface will produce swaying and unless a dampening effect is provided by the suspension, such swaying may continue for a long period of time or increase to dangerous proportions. Further, the suspension must provide means for maintaining the running gear in alignment in order that the wheels will track over various conditions of loading or road condition. While the provision of the air cushion as the load carrying element provides for a soft ride due to the low spring constant as compared to metal springs, the problems which must be overcome are varied and quite different from those found in more conventional suspension systems. Attempts have been made to utilize the suspension provided for metal springs as suspensions for air cushions. Since the characteristics of air cushions as compared to metal springs are so different, such suspensions have not been adequate. A suspension system as disclosed herein provides control of the forces above mentioned by utilizing a simple and direct design which accomplishes the necessary results without complicated parts needing frequent attention.

Accordingly, it is an object of this invention to provide a suspension assembly for a vehicle which will maintain the axle in proper supporting relationship to the vehicle while operating under varying conditions of road surface.

Another object of this invention is to provide a suspension assembly for a vehicle which will eliminate swaying of the vehicle during operation over uneven road surfaces.

A still further object of this invention is to provide a suspension assembly for a vehicle which will maintain tracking alignment over various conditions of loading and road conditions.

Other objects of the invention will appear from the following descriptions taken in connection with the drawings.

In the drawings:

Fig. 1 is a side elevational view of the vehicle suspension which forms the preferred embodiment of my invention;

Fig. 2 is a top view with parts cut away for the purpose of clarity of one side of the assembly shown in Fig. 1;

Fig. 3 is a sectional view taken along line 3—3 of Fig. 1;

Fig. 5 is a side elevational view of a modified form of suspension;

Fig. 6 is a side elevational view of another modified form of suspension;

Figure 4:
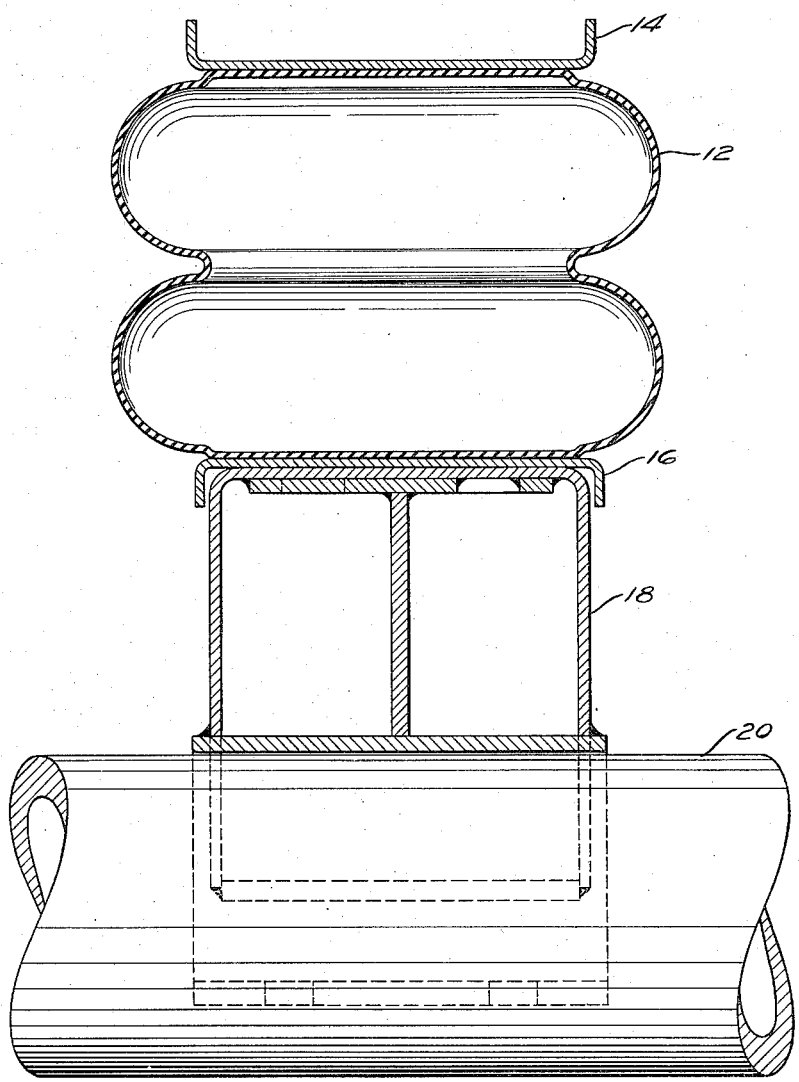
Fig. 4 is a sectional view taken along line 4—4 of Fig. 1.

Referring first to Fig. 1 in which the preferred embodiment of my invention is shown, a beam 10 is provided for holding the various elements of the suspension assembly in such a way that the assembly may eventually be attached to a vehicle such as a trailer, in which case the stringer of the trailer bed would rest on a beam 10 and the load from the vehicle would be distributed to the component parts of the assembly through the beam 10. Air cell 12 in the form of an elongated bellows-type flexible container is positioned beneath each beam 10 generally located at each side of the vehicle. The air cell 12 is fabricated in the manner of a pneumatic tire in that alternate layers of rubber and fabric are molded into an air tight and flexible gas receiving cell. The cell 12 has strength characteristics which make possible the use of operating pressures therein as high as 120 pounds per square inch gauge. The air cell 12 is affixed to channel 14 which engages the beam 10 and supplies the necessary attachment structure for holding the air cell 12 in operating relationship with the beam 10. A second channel 16 is affixed to the opposite side of the air cell 12 from the channel 14 and engages an air beam 18. The air beam 18 is a hollow elongated box-like structure fabricated to retain air under pressure and distributes the force applied by the air cell 12 to the axle 20. When the air cell 12 is distensible by the pressure of the gas contained therein, a beam such as air beam 18 operates in engagement with the load carrying area of cell 12 to distribute the forces from the axle 20 over the entire load carrying area.

An orifice 22 connects the air cell 12 to the interior of the air beam 18 and provides a passage for the air to flow between these members. A threaded bushing 24 passes through the upper wall of the air beam 18 and engages a gasket 26 which prevents leakage from the assembly. A hand hole 28 allows access to the interior of the air beam for making up the bushing connection, the hand hole 28 being closed by a cover 30 which is removable for the above mentioned purpose.

Rebound control of the vehicle after a sudden compressive load on the air cell 12 is provided by a rod 32 fixed at one end to the beam 10. The rod 32 passes through an opening 34 in the air beam 18 with clearance therebetween to allow freedom for relative movement. A pair of rubber bumpers 36 are carried by the rod 32 so that when the beams 10 and 18 tend to separate, bumpers 36 are compressed. This compression is achieved by a washer 38 engaging the bumpers 36 and a head 40 on the rod 32. Adjustment on the rebound control is obtained by changing the length of the rod 32 and applying slight compression to the rubber bumpers 36 in the normal operating position. The rebound control functions further in reacting to sway conditions and reducing such forces by utilizing the weight of the axle assembly to produce a sway dampening affect. In Fig. 1 the rebound control is shown at the rear of the beam structure where maximum affect is obtained in combination with rebound control at the opposite end of the beams to be described hereafter.

The axle 20 is provided with a mounting assembly which allows rigid attachment to the beam 18 and also removability. A recess 42 having a closed wall is located in the lower side of the beam 18 approximately midway between the ends. The recess 42 has walls 44 which diverge in a downward direction. The axle 20 has a pair of clamping bars 46 welded to each side thereof, in such a manner that the outer walls are divergent at the same angle as the walls 44 of recess 42 when the axle 20 is in place. Therefore, the clamping bars 46 are complementary with the recess 42 and effect a tight fit therewith as the axle moves upwardly in the recess. It is noted that a clearance is provided between the top portion of the axle assembly and the bottom wall of the recess 42. A pair of bolts 48 hold the axle in the recess by locking the clamping bars 46 to the beam 18. Large torsional stresses occur in the axle resulting from applying brakes on the vehicle which must be resisted by the suspension assembly, such torsional forces are transmitted to the clamping bar assembly and to the beam 18 without applying appreciable stress to the bolts 48. This is accomplished by the geometry of the recess and the complementary parts affixed to the axle.

A bracket 50 is affixed to the beam 10 forward of the air cell 12 and is supported at its outer end by a brace 52 also affixed to the beam 10. The link 54 is rotatably mounted in bracket 50 by pin 56 secured thereto by bolts 58. The opposite end of the link 54 is rotatably joined to the beam 18 by pin 60, and is held in position by bolts 62. A rubber bushing 64 surrounds the pin 60 and engages the link 54 to obtain a flexible resilient mounting for a shock absorbing quality, link 54 being restrained at one end by the beam 10 and joined at the opposite end to beam 18 that functions as the direct coupling linkage between the axle 20 and the vehicle frame. Accordingly, the link 54 maintains the axle in the predetermined fore and aft position and absorbs the thrust from the braking action. The provision of links 54 on each air beam 18 at each side of the vehicle respectively maintains the axle 20 in proper transverse relationship for assuring proper tracking of the wheels.

A rubber bumper 66 is affixed to the upper surface of the link 54 and engages the lower wall 68 of the beam 18 when the torsional stress on the axle 20 is such that the forward end of the beam 10 tends to rotate downwardly. Such force is applied to the bumper 66 and transmitted to the beam 10 or the axle 20 and thereby prevents the beam 18 from further rotation. A stirrup 70 is affixed to the beam 18 and has the rebent portion thereof located beneath the link 54. Stirrup 70 is engaged by a rubber bumper 172 affixed to the lower side of the link 54 opposite to the bumper 66. When the torsion in the axle 20 is such that the forward end of the beam 18 is raised the bumper 172 operating against the stirrup 70 absorbs the torsional force, thus holding the beam 18 against undue compression of the air cell at the forward end. The bumpers 66 and 172 also overcome the tendency for sway by materially changing the spring constant of the assembly when abnormal conditions occur therein.

The air pressure in the air cells 12 is controlled at a value which will maintain a height of the air cell substantially constant for all possible loadings of the vehicle. A valve 72 is provided for each air cell 12 respectively and is of the type commonly known as a three-way valve. An air supply connection 74 connects the valves 72 to a regulated pressure system ordinarily found on vehicles having air brakes. A flexible connection 76 is made between each air beam 18 and the valves 72 which allows the valves 72 to vent the air to and from the air beam and the associated air cell 12. Levers 78 are associated with each valve 72 in such a manner that upward movement of the end thereof allows air to flow into the air cell 12. The levers are connected to the air beams 18 by rods 80. The end of each rod is adjustably affixed to the air beam 18 in order that the height of the air cell may be regulated. Since the valves 72 are affixed to a cross member 82 which is fixed at each end to beam 10 any relative change in height between the beam 18 and beam 10 is reflected in motion of the levers 78 with the result that the air cell 12 is automatically controlled at the predetermined height. The provision of valves 72 for each air cell 12 gives independent control of the height of the air cells irrespective of unsymmetrical loading of the vehicle. The vehicle, therefore, is maintained level although one side thereof may be carrying more weight than the other.

Figure 7:
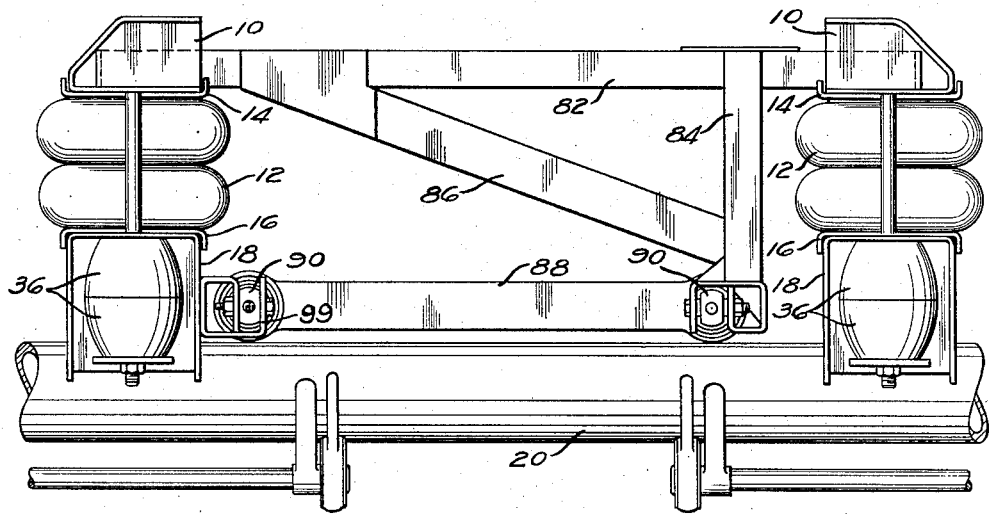
Fig. 7 is a rear view of the suspension shown in Fig. 1.
Figure 8:
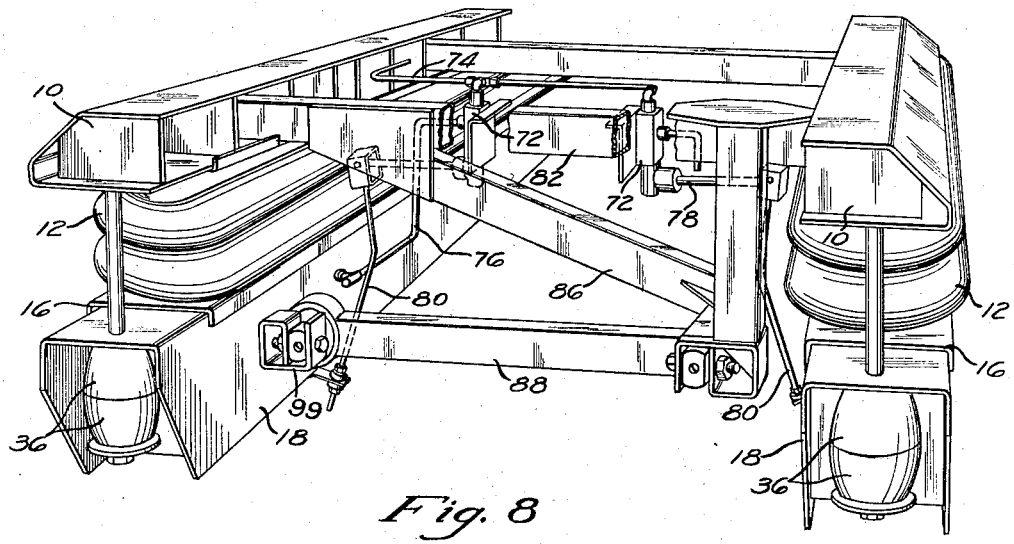
Fig. 8 is a perspective view of the suspension shown in Fig. 1.

The member 82 connecting the beams 10 supports a depending bracket 84 which is stiffened by a brace 86. A link 88 is pivoted at each end respectively to the bracket 84 and the air beam 18. Bolts 90 having rubber bushings on the outer ends thereof are retained in bolt carriers 99 secured to the beam 18 and the lower end of the bracket 84. This structure provides a resilient mounting for the link 88. In Fig. 7 the rear view of the assembly shows that the link 88 has its left hand end connected to the air beam 18 which is rigid to the axle 20. Since highways are generally crowned, the normal thrust would produce tension in the link 88, however link 88 is of such strength and dimension that any compressive forces are also restrained. The link 88 maintains the rear ends of the beams 10 and 18 in vertical alignment during relative vertical motion. Since the air cell 12 is not capable of restraining lateral movement, the link 88 maintains the axle in proper alignment for tracking of the wheels with other wheels on the vehicle.

The modifications shown in Figs. 5 and 6 are similar in most respects to the embodiment illustrated in Fig. 1, except that the forward bracket 92 is in the form of a V having the upper ends thereof affixed to the chassis frame 100 and an attachment for the torque arm at the point thereof, for controlling the fore and aft position of the axle. A link 54 is rotatably connected to the bracket 92 by a pin 56. The pin 56 is bolted to the bracket 92 by a bolt 94 disposed at an angle of approximately 30 degrees to the center line of the link 54, and the opposite end of the link 54 is connected in similar manner by pin 60 and bolt 96. The disposition of bolts 94 and 96 and angular relationship to the center line of the link 54 simplifies the attachment of the pins 56 and 60 to the restraining member while distributing the tension and sheer stresses in the mounting structure in a more desirable manner.

In the modification shown in Fig. 6 the box-like bracket 97 provides the anchoring feature forward of the air beam 18, the link 54 being restrained by rubber mounted pins at each end. In each instance the link 54 provides the stabilization required to prevent sway and to absorb torque in the axle produced by braking the vehicle.

It is to be understood that the specific nature of the present disclosure is not intended to be restrictive or confining and that various rearrangements of parts and modifications of design may be resorted to without departing from the scope or spirit of the invention as herein claimed.

Having thus described my invention, what I claim and desire to be secured by Letters Patent is:

1. A suspension assembly for a vehicle comprising wheel and axle means, a vehicle chassis, a beam affixed to said axle means perpendicular thereto, a second beam engaged with said chassis, said first and second beams being substantially parallel, a depending bracket on said second beam having the free end thereof forward of said first beam, a link rotatably affixed to the free end of said bracket and rotatably affixed to said beam intermediate the axle means and the forward end thereof, and a resilient bumper affixed to the upper side of said link in engagement with the lower surface of the forward end of said beam.

2. A suspension assembly for a vehicle comprising wheel and axle means, a vehicle chassis, a beam affixed to said axle means perpendicular thereto, a second beam engaged with said chassis, said first and second beams being substantially parallel, a depending bracket on said second beam having the free end thereof forward of said first beam, a link rotatably affixed to the free end of said bracket and rotatably affixed to said beam intermediate the axle means and the forward end thereof, resilient bumper means affixed to the upper and lower sides of said link, shoulder means affixed to the forward end of said beam and having a portion below said link, said bumper means engaging the lower surface of the forward end of said beam and said portion of the shoulder means.

3. A suspension assembly for a vehicle comprising wheel and axle means, a vehicle chassis, a beam affixed to said axle means perpendicular thereto, a second beam engaged with said chassis, said first and second beams being substantially parallel, a depending bracket on said second beam having the free end thereof forward of said first beam, a link rotatably affixed to the free end of said bracket and rotatably affixed to said beam intermediate the axle means and the forward end thereof, a resilient bumper affixed to the upper side of said link in engagement with the lower surface of the forward end of said beam, a stirrup affixed to the forward end of said beam and having a rebent portion below said link, and a second resilient bumper thereon affixed to the lower side of said link and in engagement with the rebent portion of said stirrup.

References Cited in the file of this patent

UNITED STATES PATENTS

| | | |
|---|---|---|
| 1,667,275 | Warhus | Apr. 24, 1928 |
| 2,290,620 | Brown | July 21, 1942 |
| 2,733,931 | Reid | Feb. 7, 1956 |
| 2,742,301 | Pointer | Apr. 17, 1956 |